Feb. 28, 1928.

E. G. McDONALD 1,660,932

BRAKE

Filed Aug. 9, 1926 2 Sheets-Sheet 1

INVENTOR
EUGENE G. McDONALD
BY
ATTORNEY

Feb. 28, 1928.  1,660,932

E. G. McDONALD

BRAKE

Filed Aug. 9, 1926     2 Sheets-Sheet 2

INVENTOR
EUGENE G. McDONALD
BY
ATTORNEY

Patented Feb. 28, 1928.

1,660,932

UNITED STATES PATENT OFFICE.

EUGENE G. McDONALD, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed August 9, 1926. Serial No. 128,045.

This invention relates to brakes, and is illustrated in connection with the adjustment of a three-shoe brake of a well-known type used on automobiles. An object of the invention is to facilitate the adjustment of the brake, by so arranging the parts that the anchoring means initially floats, and shifts to adjust itself when the brake is applied, whereupon it is secured in adjusted position.

Preferably there are two anchors, connected by a reinforcing member which during the adjustment serves to constrain the one anchor to shift about the other as a center. One feature relates to pressing the two anchors into openings in the ends of the connecting reinforcing member to give a compact sub-assembly permitting the desired shifting movements during adjustment.

The above and other objects and features of the invention will be apparent from the following description of one illustrative construction shown in the accompanying drawings, in which.

Figure 1:
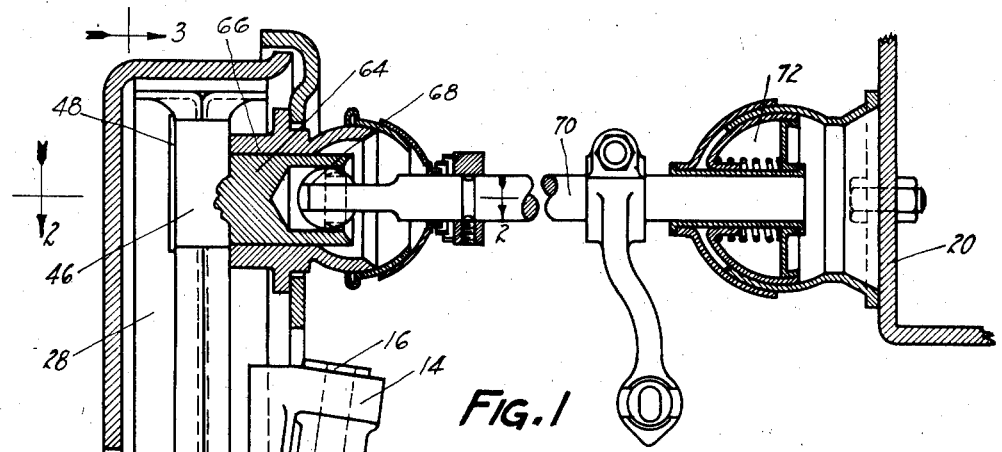
Figure 1 is a vertical section through one brake and associated parts.

The brake selected for illustration includes a drum 10 rotating with a wheel (not shown) mounted on the spindle 12 of a knuckle 14 swivelled by a pin 16 or the like at one end of an axle 18. The axle 18, with a rear axle (not shown), supports through the usual springs a chassis frame 20. Knuckle 14 supports a backing plate 22 at the open side of the drum.

Within the drum 10 are arranged three shoes 24, 26, and 28, shoes 24 and 28 preferably being interchangeable and being formed at their ends with spaced arms 30 straddling the opposite ends of shoe 26. Shoe 24 is anchored on a pin 32 projecting through a relatively large opening 34 in the web of shoe 26. Shoe 26 is anchored on a pin 36 passing through openings 38 in the arms 30 of shoe 24. Shoe 28 is connected to the unanchored end of shoe 26 by a pivot 40. According to one feature of the invention, pins 32 and 36, which are preferably serrated at 42, are pressed into openings in the ends of a reinforcing and connecting member 44, to form a permanently-associated sub-assembly unit.

The brake is applied by means such as a double cam 46, shown with a flange 48 confining the shoes laterally, and which forces shoes 24 and 28 apart against the resistance of a return spring 50. Shoe 26 is applied by shoe 28, against the resistance of an auxiliary return spring 52. Undue lateral movement of the shoes is prevented by novel means, shown as including pins 54 secured to backing plate 22, and passing through openings 56 in the shoes. Washers 58 on each pin 54, on opposite sides of the shoe, are held by a cotter pin 60 or the like, and a coil spring 62 is sleeved on the pin between the shoe and the backing plate. Spring 62 yieldingly holds the shoe in a normal position positively defined by the washer 58 on the free end of pin 54.

Figure 2:
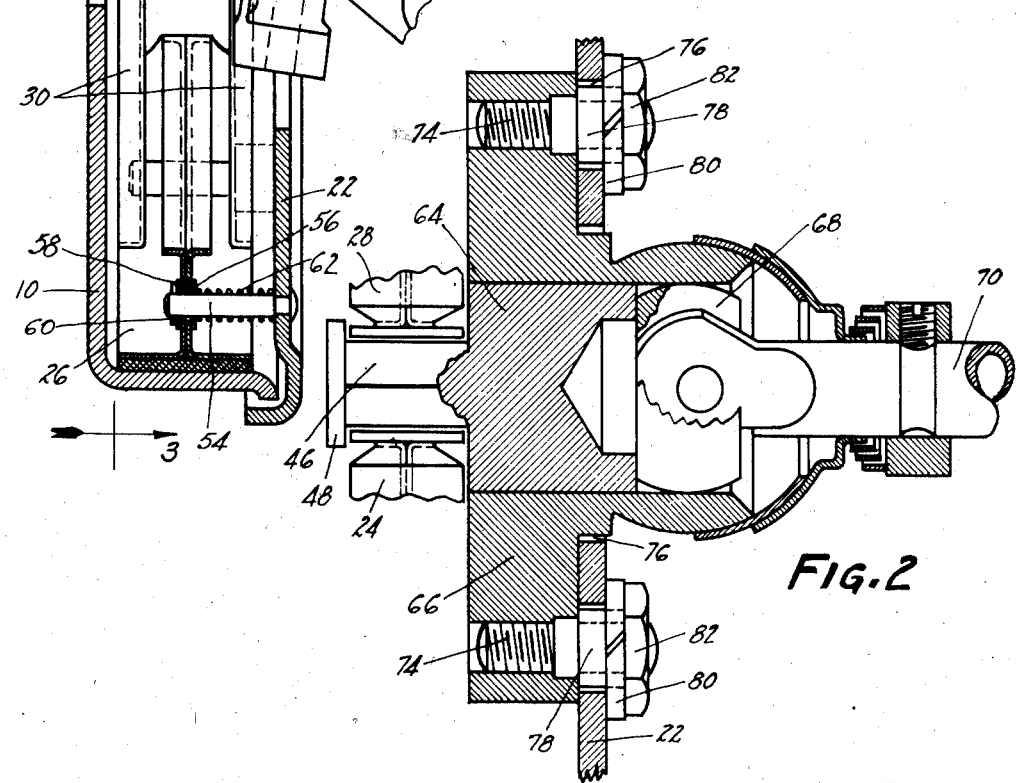
Figure 2 is a partial section on the line 2—2 of Figure 1, showing a frictionally-clamped self-centering brake-applying device.
Figure 3:
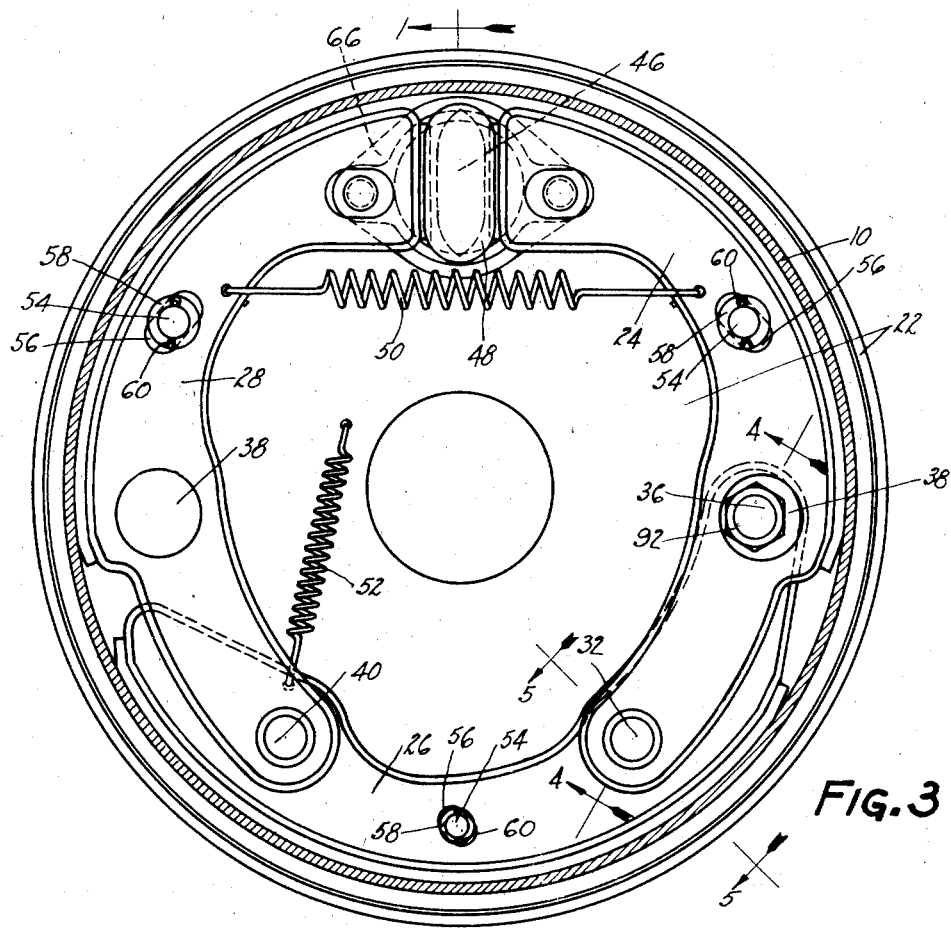
Figure 3 is a section through the brake on the line 3—3 of Figure 1, showing the shoes in side elevation.

Cam 46 is shown as integral with a cam shaft 64 journalled in a bracket 66, and operated through a universal joint 68 by a shaft 70 universally and slidably held by a support 72 carried by frame 20. I prefer that bracket 66 should be frictionally clamped to the backing plate 22, so that it may shift to center the cam 46, for example as shown in Figure 2. In that figure, bracket 66 is shown with studs 74 projecting through relatively large openings 76 in the backing plate, and on which are sleeved stop members 78 against which spring washers 80 are clamped by nuts 82.

Figure 4:
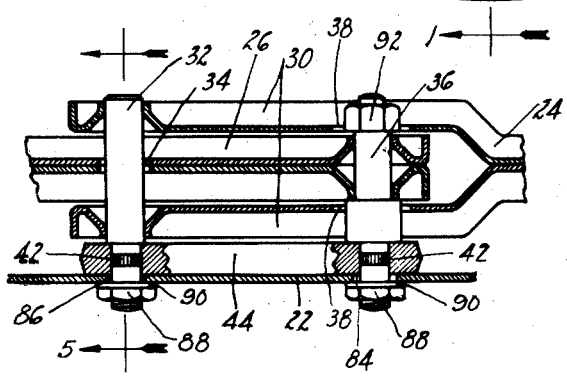
Figure 4 is a partial section on the line 4—4 of Figure 3, showing the novel anchor arrangement.
Figure 5:
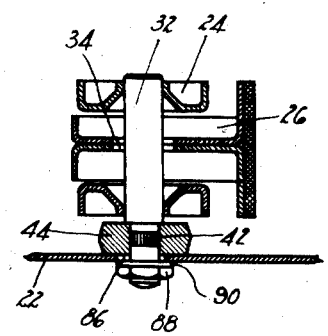
Figure 5 is a partial section through one of the anchors, on the line 5—5 of Figure 3 (or 4).

As best appears in Figures 4 and 5, anchor pin 36 projects through a relatively large opening 84 in the backing plate, this opening being circular in outline and giving considerable clearance on all sides of the pin. Pin 32 projects through a radial slot 86, giving considerable clearance radially of the brake but practically none at right angles to the radius. The pins are clamped to the backing plate, after the brake is adjusted, by means such as nuts 88, which may be provided with washers 90. Pin 36 is also threaded at its opposite end for a nut 92 which prevents shifting of the shoes axially of the pins.

A very important feature of the invention relates to the adjustment of the brake. With the parts all assembled, but with nuts 88 not tightened, the brake is applied by rocking shaft 64. Since pin 32 cannot move circumferentially of the brake, the pressure lengthwise of shoe 24 from the cam forces the pin radially outward in slot 86 until the lining of the shoe seats uniformly against the drum. The pressure of shoe 26 on pin 36 at the same time serves to swing the pin (with connecting member 44 serving as a radius arm) outwardly about pin 32 as a center to adjusted position. Cam 46, on account of the mounting shown in Figure 2, also shifts if necessary to center itself, so that all of the parts of the brake are automatically and accurately located in their adjusted positions with respect to the sides of slot 86, which therefore serve as gage points.

To look at the adjustment from a somewhat different point of view, drum 10 is almost entirely filled by the shoes, which are forced firmly against its inner surface, shifting the anchors 32 and 36 as may be necessary to give uniform seating of the shoes. If the pins are initially too near the drum, the shoes rock so as to serve as levers swinging the pins radially inward, while if they are too far from the drum the pressure forces the pins outward. Member 44 keeps the pins a predetermined distance apart, and the cam automatically shifts to center itself.

Before the brake is released, nuts 88 are tightened to preserve the adjustment of the anchor pins.

In case it is not desired to use an automatically shifting cam, bracket 66 may be clamped tight and the parts of the brake adjusted with respect to the cam instead of with respect to slot 86. In this case slot 86 is widened to permit a slight movement of pin 32 circumferentially, to compensate for the lack of movement in the cam. The adjustment is made as described above, by applying the brake before tightening nuts 88.

While I have described a number of desirable mechanical constructions in great detail, it is not my intention to limit the scope of the invention to those exact constructions, or otherwise than by the terms of the appended claims.

I claim:

1. That method of adjusting a brake having an anchor movable in a radial slot, which comprises the step of applying the brake with the anchor free to float, thus forcing the anchor radially outward to adjusted position, and then securing the anchor in said adjusted position.

2. That method of adjusting a brake having two anchors connected by a rigid member, which comprises arranging one anchor in a radial slot and the other in an opening giving clearance all around, with the anchors and connecting member free to float, then applying the brake, to force said one anchor radially outward in its slot to adjusted position and to swing the second anchor outwardly to adjusted position in an arc about the first anchor, and finally securing said anchors in adjusted position.

3. That method of adjusting a brake having a frictionally-clamped shiftable and self-centering applying device and an anchor movable in a radial slot, which comprises the step of applying the brake with the anchor free to float, thus forcing the anchor radially outward to adjusted position and automatically shifting the applying device to adjusted position, and then securing the anchor in said adjusted position.

4. That method of adjusting a brake having a frictionally-clamped shiftable and self-centering applying device and two anchors connected by a rigid member, which comprises arranging one anchor in a radial slot and the other in an opening giving clearance all around, with the anchors and connecting member free to float, then applying the brake, to force said one anchor radially outward in its slot to adjusted position and to swing the second anchor outwardly to adjusted position in an arc about the first anchor and at the same time to shift the applying device to adjusted position, and finally securing said anchors in adjusted position.

5. That method of adjusting brakes having two anchors connected by a rigid member, which comprises applying the brake with both anchors free to shift to adjust themselves, but one constrained by the rigid member to shift about the other, and then securing the anchors against further shifting, in their adjusted positions.

6. An anchor assembly for a brake comprising a rigid connecting member having openings through its ends, and two anchors having serrated portions pressed into said openings.

7. An anchor assembly for a brake comprising a rigid connecting member having openings through its ends, and two anchors mounted on said member and having portions which are a press fit in said openings, said anchors projecting on one side of the connecting member for engagement with the shoes, and projecting on the other side to pass through openings in a backing plate.

8. A brake comprising, in combination, a backing plate, a shoe having an opening in its web, a pin secured at one end to the backing plate and passing through said opening and having means at its end positively preventing movement of the shoe from its normal position toward said end of the pin, and a coil spring sleeved on the pin between the shoe and the backing plate.

In testimony whereof, I have hereunto signed my name.

EUGENE G. McDONALD.